(12) United States Patent  
    Törnkvist

(10) Patent No.:     US 12,683,411 B2  
(45) Date of Patent:          Jul. 14, 2026

(54) METHODS AND SYSTEMS FOR CHARGING FOR DEVICE IDENTIFICATION, ADDITION AND/OR CHANGE

(71) Applicant: Telefonaktiebolaget LM Ericsson (publ), Stockholm (SE)

(72) Inventor: Robert Törnkvist, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 767 days.

(21) Appl. No.: 18/011,168

(22) PCT Filed: Jun. 17, 2020

(86) PCT No.: PCT/SE2020/050629  
    § 371 (c)(1),  
    (2) Date: Dec. 17, 2022

(87) PCT Pub. No.: WO2021/256971  
    PCT Pub. Date: Dec. 23, 2021

(65) Prior Publication Data  
    US 2023/0223764 A1     Jul. 13, 2023

(51) Int. Cl.  
    H02J 7/47          (2026.01)  
    H02J 7/42          (2026.01)  
            (Continued)

(52) U.S. Cl.  
    CPC ................. H02J 7/47 (2026.01); H02J 7/42 (2026.01); H04W 76/14 (2018.02); H04W 76/15 (2018.02)

(58) Field of Classification Search  
    CPC . H02J 7/00045; H02J 7/00034; H04W 76/15; H04W 76/14  
            (Continued)

(56) References Cited

U.S. PATENT DOCUMENTS 11,206,640 B2 * 12/2021 Novlan ................. H04W 76/14  
2013/0288668 A1    10/2013 Pragada et al.  
            (Continued)

FOREIGN PATENT DOCUMENTS

WO      WO 2015/010258 A1     1/2015  
WO      WO 2015/065079 A1     5/2015  
WO      WO 2015/088402 A1     6/2015

OTHER PUBLICATIONS

International Search Report and Written Opinion of the International Searching Authority, PCT/SE2020/050629, mailed Mar. 25, 2021, 6 pages.  
            (Continued)

*Primary Examiner* — Suchin Parihar  
(74) *Attorney, Agent, or Firm* — Sage Patent Group

(57)             ABSTRACT

Systems and methods are provided for charging for a connection in a radiocommunication system that provides services to both a device which is directly connected to the radiocommunication system and one or more other devices which connect to the radiocommunication system using, e.g., the transceiver of the device which is able to directly connect to the radiocommunication system. A method for charging for a first device which is connected to a second device that has radiocommunication connectivity includes receiving, at a node in the radiocommunication system, a charging authorization message for the second device's connection to the radiocommunication system, which charging authorization message includes the device identifier associated with the first device; adding, by the node in the radiocommunication system, the device identifier for the first device to a list associated with the second device; and sending an indication that a connection for the first and second device is authorized.

13 Claims, 8 Drawing Sheets

<u>100</u>

(51) Int. Cl.
  *H04W 76/14*      (2018.01)
  *H04W 76/15*      (2018.01)
(58) Field of Classification Search
  USPC ......................................................... 320/107
  See application file for complete search history.

(56)                References Cited

U.S. PATENT DOCUMENTS

| | | | |
|---|---|---|---|
| 2014/0130137 A1 | 5/2014 | Baek et al. | |
| 2016/0241721 A1* | 8/2016 | Soelberg | H04M 15/09 |
| 2017/0055195 A1* | 2/2017 | Ingale | H04W 76/27 |
| 2019/0274175 A1 | 9/2019 | Hassan et al. | |
| 2020/0059976 A1* | 2/2020 | Bhatia | H04W 8/005 |
| 2020/0092423 A1 | 3/2020 | Qiao et al. | |
| 2021/0235266 A1* | 7/2021 | Starsinic | H04W 8/183 |
| 2022/0353735 A1* | 11/2022 | Porfiri | H04L 47/2475 |

OTHER PUBLICATIONS

3rd Generation Partnership Project; Technical Specification Group Core Network and Terminals; 5G System; Session Management Policy Control Service; Stage 3 (Release 16) 3GPP TS 29.512 V16.4.0 (Mar. 2020) 186 pages.
3rd Generation Partnership Project; Technical Specification Group Services and System Aspects; Telecommunication management; Charging management; Exposure function northbound Application Program Interfaces (APIs) charging (Release 16) 3GPP TS 32.254 V16.2.0 (Sep. 2019) 36 pages.
3rd Generation Partnership Project; Technical Specification Group Services and System Aspects; Telecommunication management; Charging management; 5G data connectivity domain charging; stage 2 (Release 16) 3GPP TS 32.255 V16.4.0 (Mar. 2020) 101 pages.
Extended European Search Report, European Patent Application No. 20941207.1, mailed Jul. 6, 2023, 7 pages.

* cited by examiner

<u>100</u>

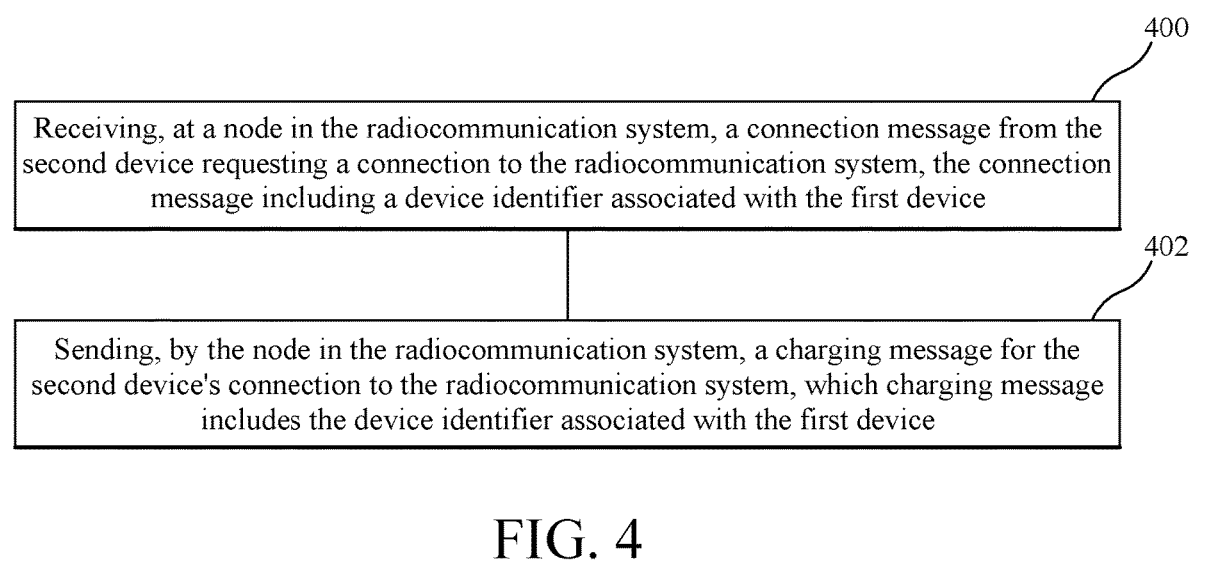

400

Receiving, at a node in the radiocommunication system, a connection message from the second device requesting a connection to the radiocommunication system, the connection message including a device identifier associated with the first device

402

Sending, by the node in the radiocommunication system, a charging message for the second device's connection to the radiocommunication system, which charging message includes the device identifier associated with the first device

FIG. 4

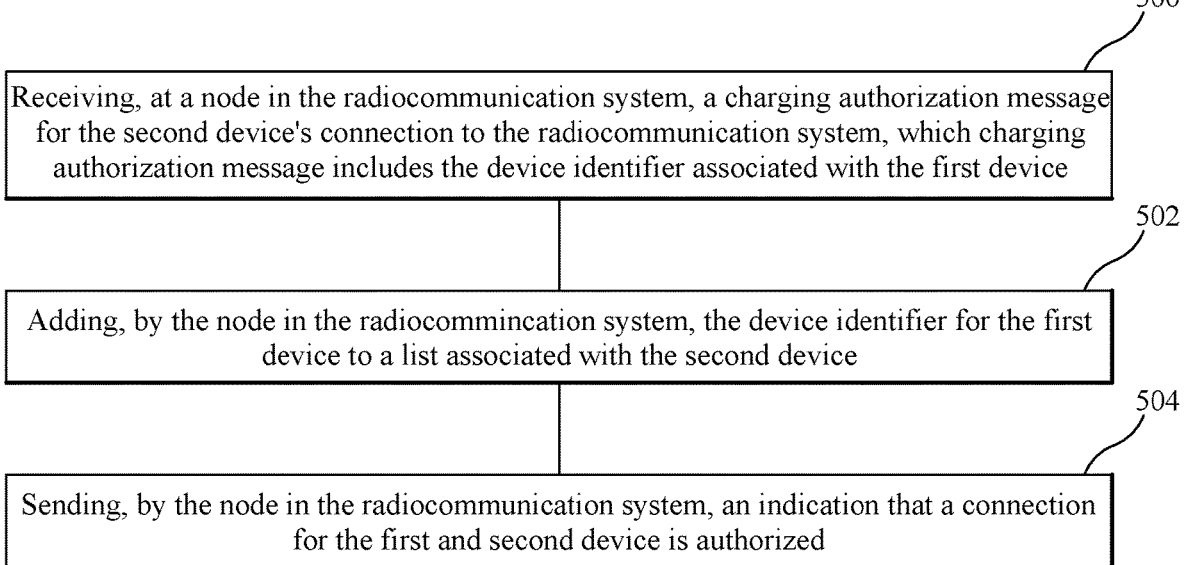

500

Receiving, at a node in the radiocommunication system, a charging authorization message for the second device's connection to the radiocommunication system, which charging authorization message includes the device identifier associated with the first device

502

Adding, by the node in the radiocommincation system, the device identifier for the first device to a list associated with the second device

504

Sending, by the node in the radiocommunication system, an indication that a connection for the first and second device is authorized

METHODS AND SYSTEMS FOR CHARGING FOR DEVICE IDENTIFICATION, ADDITION AND/OR CHANGE

CROSS REFERENCE TO RELATED APPLICATIONS

This application is a 35 U.S.C. § 371 national stage application of PCT International Application No. PCT/SE2020/050629 filed on Jun. 17, 2020, the disclosure and content of which is incorporated by reference herein in its entirety.

TECHNICAL FIELD

The present invention generally relates to communication networks and, more particularly, to mechanisms and techniques for charging systems.

BACKGROUND

Over time the number of products and services provided to users of telecommunication products has grown significantly. For example, in the early years of wireless communication, devices could be used for conversations and later also had the ability to send and receive text messages. Over time, technology advanced and wireless phones of varying capabilities were introduced which had access to various services provided by network operators, e.g., data services, such as streaming video or music service. More recently there are numerous devices, e.g., so called "smart" phones and tablets, which can access communication networks in which the operators of the networks, and other parties, provide many different types of services, applications, etc. Accordingly, there need to be methods and systems for efficiently charging for services, particularly, as service offerings exist in a dynamic environment with expectations of increased volume and new types of services becoming available.

In the current charging framework specified in 3GPP for the Session Management Function (SMF) and Network Exposure Function (NEF), there are triggers for a number of different type of events connected to SMS and the PDU Session, and prior to that the Packet Gateway (PGW) and Serving Gateway (SGW) could trigger charging for the same or equivalent events (see, e.g., 3GPP TS 32.255 and 3GPP TS 32.254).

With the advent of the Internet of Things (IOT) where almost every one of millions upon millions of devices will need some sort of network connectivity, there is a need to optimize the provision of network connectivity since the need for having a 5G network connectivity capability installed locally in every one of these millions of devices would add significantly to the cost and energy consumption of those devices. If the devices are located physically close together, one alternative to providing 5G connectivity to every device would be to instead have several devices connected to one device that provides the 5G connectivity to the entire group of devices such that only one device per group had, e.g., a 5G transceiver. This could be accomplished by connecting the non-5G connectable devices to the device having the 5G connectivity capability over a short range with low or little power requirements using, e.g., Bluetooth, Ethernet or Near-Field Communications (NFC). Today, the identifier which is passed to the network for charging from a device having 5G network connectivity is its International Mobile Equipment Identity (IMEI). Such devices may also possess a MAC address which can be used for providing ethernet types of connections. However, the MAC address in 5G connectable devices is not treated as a device identity for purposes of charging for services but is instead simply used as an address of its own. Moreover, there is no provision in the 3GPP charging specifications such as TS 32.290 and TS 32.291 to provide for charging in scenarios like the one described above, e.g., to charge for one or more devices that connect to a 5G network through another 5G connectable device and which devices don't have 5G capable transceiver of their own. This means that if a network operator wanted to base its charging based on how many devices that are currently connected through another device, such charging functionality isn't currently possible.

Thus, there is a need to provide methods and systems that overcome the above-described drawbacks associated with charging in communication networks.

SUMMARY

Embodiments provide various mechanisms to enable devices which cannot directly connect to a wireless network to connect to the wireless network via a device which can directly connect to the wireless network. Such embodiments can also provide networks and network operators with the capability to determine when devices which do not have the capability to connect to the networks are connected to, or are being connected to, the networks through other devices. This capability can then be used to determine charging events, triggers and other related activities.

According to an embodiment, a method for charging for a first device which is connected to a second device that has radiocommunication connectivity includes receiving, at a node in the radiocommunication system, a connection message from the second device requesting a connection to the radiocommunication system, the connection message including a device identifier associated with the first device; and sending, by the node in the radiocommunication system, a charging authorization message for the second device's connection to the radiocommunication system, which charging authorization message includes the device identifier associated with the first device.

According to an embodiment, a method for charging for a first device which is connected to a second device that has radiocommunication connectivity, includes the steps of receiving, at a node in the radiocommunication system, a charging authorization message for the second device's connection to the radiocommunication system, which charging authorization message includes the device identifier associated with the first device; adding, by the node in the radiocommunication system, the device identifier for the first device to a list associated with the second device; and sending, by the node in the radiocommunication system, an indication that a connection for the first and second device is authorized.

According to an embodiment, a method for connecting a first device to a radiocommunication system via a second device that has radiocommunication connectivity, the method includes the steps of receiving, by the second device, an indication that the first device requests a connection to the radiocommunication system; obtaining, by the second device, a device identifier associated with the first device; sending, by the second device, a connection request to the radiocommunication system, the connection request including the device identifier associated with the first device; and enabling, by the second device, the first device to communicate with the radiocommunication system.

According to an embodiment, there is a node in a tele-communication system for charging for a first device which is connected to a second device that has radiocommunication connectivity, the node includes a communication interface configured to receive a charging authorization message for the second device's connection to the radiocommunication system, which charging authorization message includes the device identifier associated with the first device; a processor configured to add the device identifier for the first device to a list associated with the second device; and wherein the processor is further configured to send, via the communication interface, an indication that a connection for the first and second device is authorized.

According to an embodiment, there is a node in a tele-communication system for charging for a first device which is connected to a second device that has radiocommunication connectivity, the node includes a communication interface configured to receive a connection message from the second device requesting a connection to the radiocommunication system, the connection message including a device identifier associated with the first device; and a processor configured to send, via the communication interface, a charging message for the second device's connection to the radiocommunication system, which charging message includes the device identifier associated with the first device.

According to an embodiment, there is a user equipment for connecting a first device to a radiocommunication system via the user equipment which has radiocommunication connectivity, the user equipment includes: a processor configured to receive an indication that the first device requests a connection to the radiocommunication system and configured to obtain a device identifier associated with the first device; and a transceiver configured to send a connection request to the radiocommunication system, the connection request including the device identifier associated with the first device; wherein the user equipment enables the first device to communicate with the radiocommunication system.

According to an embodiment, there is a computer-readable storage medium containing a computer-readable code that when read by a processor causes the processor to receive, at a node in the radiocommunication system, a connection message from the second device requesting a connection to the radiocommunication system, the connection message including a device identifier associated with the first device; and to send, by the node in the radiocommunication system, a charging message for the second device's connection to the radiocommunication system, which charging message includes the device identifier associated with the first device.

According to an embodiment, there is a computer-readable storage medium containing a computer-readable code that when read by a processor causes the processor to receive, by the second device, an indication that the first device requests a connection to the radiocommunication system; to obtain, by the second device, a device identifier associated with the first device; to send, by the second device, a connection request to the radiocommunication system, the connection request including the device identifier associated with the first device; and to enable, by the second device, the first device to communicate with the radiocommunication system.

According to an embodiment, there is a computer-readable storage medium containing a computer-readable code that when read by a processor causes the processor to receive, at a node in the radiocommunication system, a charging authorization message for the second device's connection to the radiocommunication system, which charging authorization message includes the device identifier associated with the first device; to add, by the node in the radiocommunication system, the device identifier for the first device to a list associated with the second device; and to send, by the node in the radiocommunication system, an indication that a connection for the first and second device is authorized.

According to an embodiment, there is an apparatus adapted to receive a connection message from a device requesting a connection to a radiocommunication system, the connection message including a device identifier associated with another device; and to send a charging message for the apparatus to connect to the radiocommunication system, which charging message includes the device identifier associated with the another device.

According to an embodiment, there is an apparatus adapted to receive a charging authorization message for a device's connection to a radiocommunication system, which charging authorization message includes a device identifier associated with another device to be connected to the radiocommunication system, to add the device identifier for the another device to a list associated with the device; and to send an indication that a connection for the device and the another device is authorized.

According to an embodiment, there is an apparatus adapted to receive an indication that another device requests a connection to the radiocommunication system, to obtain a device identifier associated with the another device, to send a connection request to the radiocommunication system, the connection request including the device identifier associated with the another device and to enable the another device to communicate with the radiocommunication system.

According to an embodiment, there is an apparatus which includes a first module configured to receive a charging authorization message for a device's connection to a radiocommunication system, which charging authorization message includes a device identifier associated with another device to be connected to the radiocommunication system; a second module configured to add the device identifier for the another device to a list associated with the device; and a third module configured to send an indication that a connection for the device and the another device is authorized.

According to an embodiment, there is an apparatus which includes a first module configured to receive a charging authorization message for a device's connection to a radiocommunication system, which charging authorization message includes a device identifier associated with another device to be connected to the radiocommunication system; a second module configured to add the device identifier for the another device to a list associated with the device; and a third module configured to send an indication that a connection for the device and the another device is authorized.

According to an embodiment, there is an apparatus which includes a first module configured to receive an indication that another device requests a connection to the radiocommunication system; a second module configured to obtain a device identifier associated with the another device; a third module configured to send a connection request to the radiocommunication system, the connection request including the device identifier associated with the another device; and a fourth module configured to enable the another device to communicate with the radiocommunication system.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 4-6 are flowcharts depicting methods according to various embodiments;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with charging for devices, e.g., IoT devices, which are obtaining their network connectivity through or via other devices, e.g., 5G CE devices. Embodiments described herein enable performance of Policy and Charging in networks based on which IoT device, or how many IoT devices, are connected to the 5G CE which has the cellular connectivity. An effect of such embodiments is that the 5G CE can, for example, be charged for connectivity while each IoT device can be charged based on its (IoT) service. According to embodiments, the 5G CE device can send device identifiers, e.g., MAC addresses, associated with devices which are connected to it and which request (or otherwise need) access to the radiocommunication system.

Figure 1:
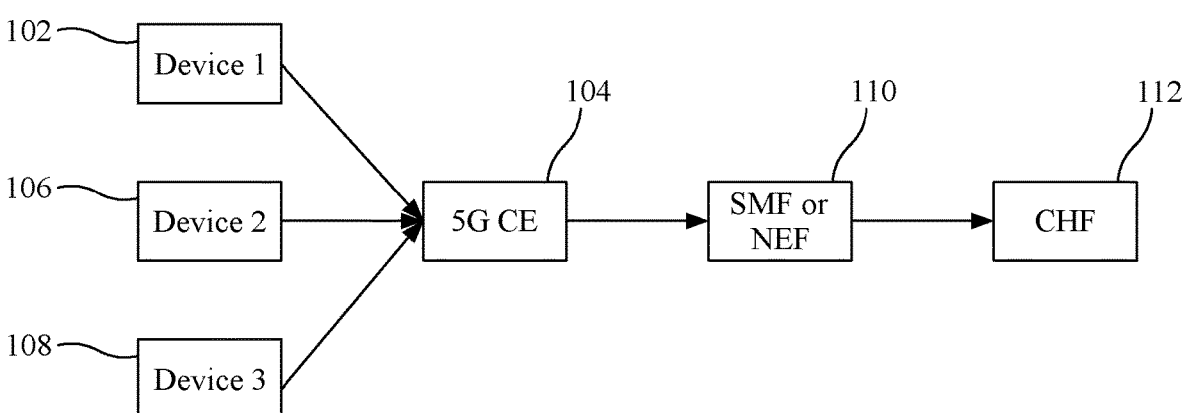
FIG. 1 illustrates an architecture according to an embodiment.
Figure 2:
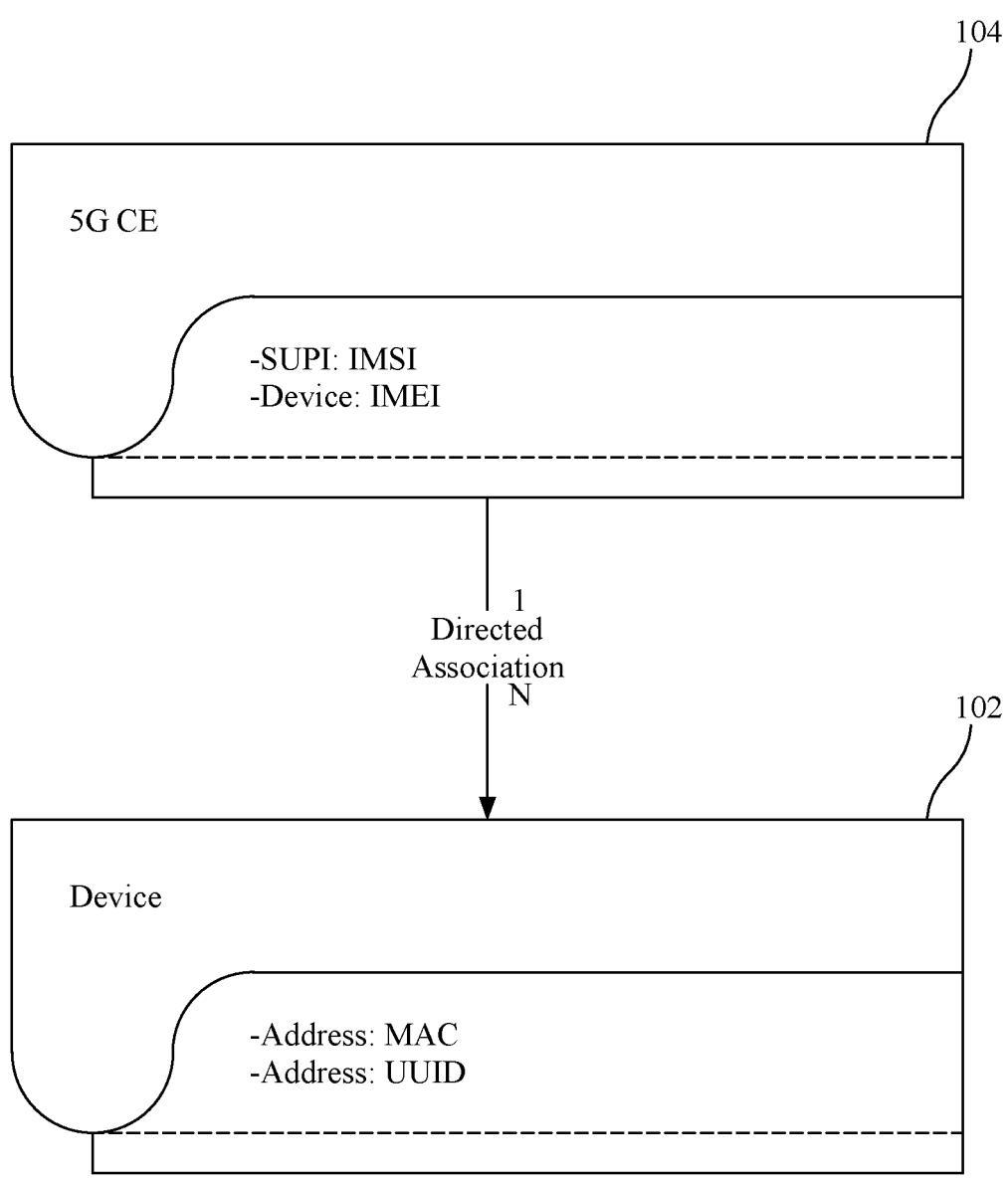
FIG. 2 shows connections between a device which has 5G connectivity capability and one or more other devices which do not have 5G connectivity capability according to an embodiment.

For example, consider the following use case of such embodiments. Suppose that a restaurant has a number of IoT devices disposed both inside and outside of its main seating area including a thermostat, a cash register, an ordering system, a security camera, C02 sensors, etc. Each of these devices has some type communication mechanism, but not a cellular transceiver or transmitter which would enable it to directly connect with a base station in a wireless communication network, and from there to other external/more distant networks. FIG. 1 illustrates three such devices 102, 106 and 108. Instead each of these devices 102, 106 and 108 are communicatively connected to a device 104 which does possess a cellular transceiver or transmitter, e.g., a 5G CE, sometimes hereinafter also referred to as a "cellular capable device". The devices 102, 106 and 108 can be communicatively connected to the device 104 using wired or wireless technologies including, but not limited to, Ethernet, WiFi, Bluetooth, RFID and the like. These connections are illustrated generally in FIG. 2, wherein it can be seen that the 5G CE 104 is connected to 1 to N devices 102, 106, 108. The device 104 can connect the devices 102, 106, 108 to the wireless network (not shown in FIG. 1) using, for example, Non-Access Stratum (NAS) protocol and/or a PDU Session, and also will gather information about the devices 102, 104, 108.

The network can be provided with the information about the devices 102, 106 and 108 which are connecting to it via device 104 in various ways. For example, according to an embodiment, the 5G CE 104 reports the usage directly to an IoT platform (not shown in FIG. 1) that in turn generates the charging information. The IoT platform could, in a 5G scenario, be a part of or connected to the Network Exposure Function (NEF) or connected to the Session Management Function (SMF) 110, which in turn could relay charging related information to the Charging Function (CHF) 112. This would mean providing to the CHF 112 from the NEF 110 information about how many devices 102, 106, 108 are connected via device 104 and their MAC address (or other identifier, e.g., UUID or IPv6 address), as well as triggers for adding, removing and changing the connected MAC addresses.

Alternatively, the Session Management Function (SMF) 110 can report the usage based on information from the 5G CE 104 and generate the charging information. This would mean providing to the CHF 112 information about how many devices 102, 104, 108 are connected via device 104 and their MAC address, as well as triggers for adding, removing and changing the connected MAC addresses. In either case, the CHF can maintain a list, e.g., a database, of MAC addresses of the devices 102, 104, 108 which are currently connected to the network via device 104, and can add devices to the list as they are connected to the 5G CE 104 (or as they are reconnected to the radiocommunication system via 5G CE 104) or can remove MAC addresses from the list when those devices 102, 104, 108 are no longer using the network.

Referring again to FIG. 1, and in this context, the NEF or SMF 110 is responsible for providing connectivity to the wireless network for devices, for creating a charging session or charging events based on the 5G CE 104's provided information, for updating the charging session when a MAC address (or other identifier) associated with one of the devices 102, 106, 108 is added, removed or changed and for terminating the charging session when all services are terminated and no new services are expected to be started. The CHF node 112 is responsible for collecting information from the NEF or SMF 110 for rating and billing, and for keeping track of the number of MAC addresses currently in use per 5G CE 104. The charging amount can be different for different types of devices 102, 106, 108 which are connected to the 5G CE 104. For example, a higher amount can be charged for a device 102 which, in addition to using the 5G CE 104 for radiocommunication connectivity, also draws power from the 5G CE 104.

Figure 3:
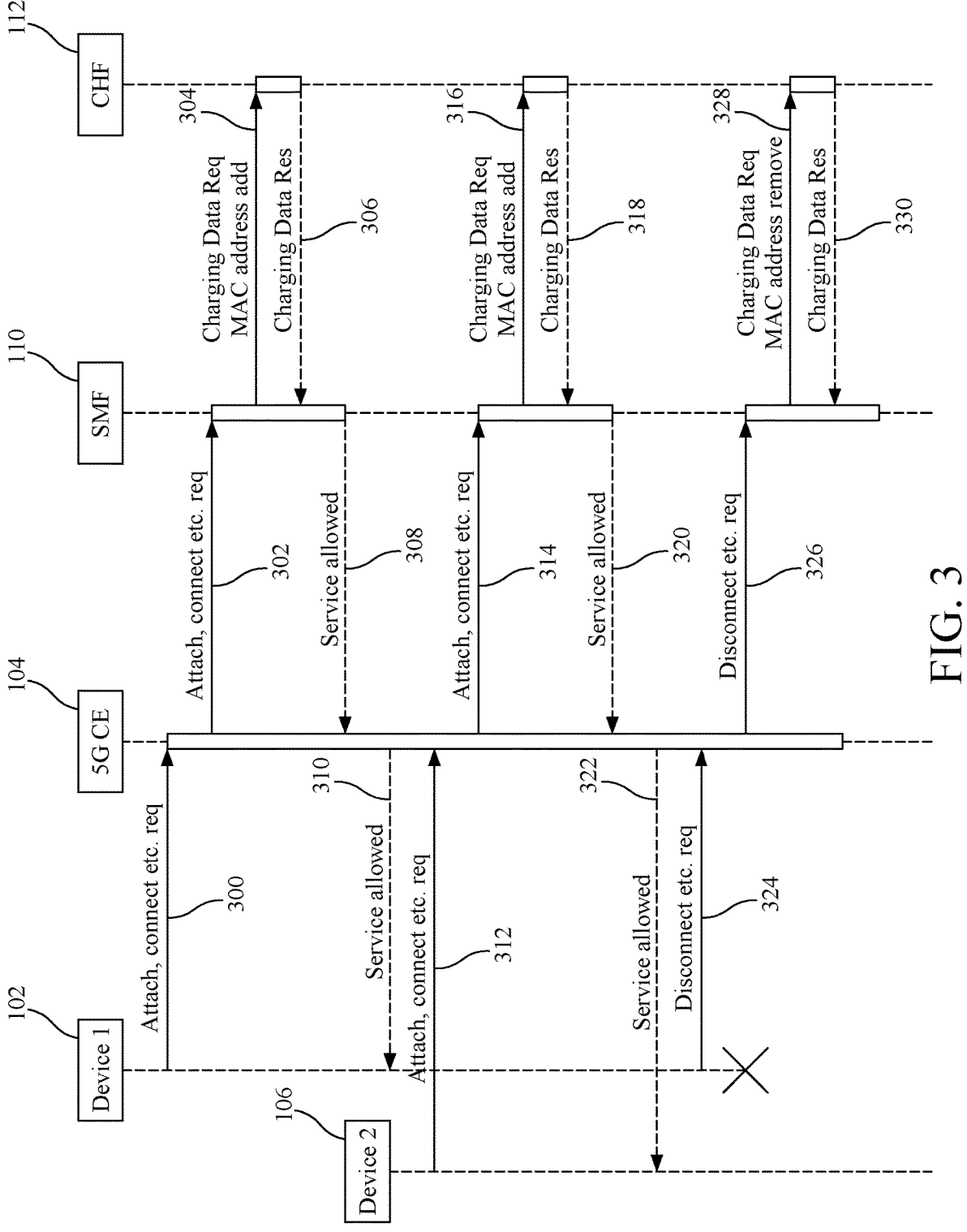
FIG. 3 is a signaling diagram according to an embodiment.

FIG. 3 illustrates a signaling diagram which depicts connectivity between the various devices 102, 104, 106 and nodes 110 and 112 described above. Therein, via signal 300, device 1 102 requests attach, connect etc. to the 5G CE 104. Via signal 302, the 5G CE 104 connects to the network (via a base station (not shown) and node SMF 110), and includes the MAC address of the device 1 102. The SMF 110 based on capabilities and polices, creates a charging data request for the device 1's connection to the network, including an "add" of the MAC address of the device 102 for the 5G CE 104's connection, and sends this signal 304 toward CHF node 112. The CHF 112 checks the account status associated with the 5G CE 104 (e.g. sufficient funds for potential charging, paid the latest bill etc.) and adds the device 102's MAC address to a list of addresses for the 5G CE 104.

The CHF 112 responds to the SMF 110 that the request is authorized via signal 306. The SMF 110 grants service access to the 5G CE 104 as indicated by signal 308. Depending on the type of device that device 102 is, the 5G CE 104 may allow the device 1 102 access to the radiocommunication system or 5G CE 104 may just send the data that the device 1 102 has requested to be sent to the radiocommunication system itself, both of which alternatives are indicated by signal 510.

To illustrate some additional features of these embodiments, consider also the activities associated with another device 106 which is also connected to 5G CE 104 as illustrated in FIG. 3. Via signal 312, device 2 106 requests attach, connect etc. to the 5G CE 104. The 5G CE 104 then connects to the network, via signal 314, and includes the MAC address of the device 2 106 in signal 314. The SMF 110, based on capabilities and polices, creates a charging data request for the device 2's connection to the network, including an "add" of the MAC address of device 2 106 for the 5G CE 104 and sends this via signal 316.

The CHF node 112 checks the account status (e.g., sufficient funds, paid the latest bill etc.), adds the device 2's MAC address to a list of addresses for the 5G CE 104 and responds to the SMF 110 that the request is authorized. The SMF 110 grants service access to the 5G CE 104 via signal 320. Depending on the type of device that device 2 106 is, the 5G CE 104 may allow the device 2 106 access to the radiocommunication system or the 5G CE 104 may just send the data that the device 2 106 has requested to be sent via the radiocommunication system, as indicated by signal 322.

By way of signal 324 device 1 102 requests to be disconnected from the 5G CE. Disconnection of a device connected to the 5G CE 104 can be explicitly signaled as shown in FIG. 3 or, alternatively, the 5G CE 104 can determine implicitly that disconnection of device 1 102 should occur based on inactivity by that device. Regardless of whether disconnection of a device is determined explicitly or implicitly, the 5G CE 104 sends a disconnect message 326 to the SMF 110. The SMF 110, based on capabilities and polices, creates a charging data request for the device 1 102's connection to the network, including a "remove" of the MAC address associated with the device for the 5G CE 104 and sends this as signal 328 to the CHF 112. The CHF 112 updates the account status accordingly and removes the device 1 102's MAC address from the list of addresses for the 5G CE 104. Then, the CHF 112 responds to the SMF 110 that the request has been handled.

The embodiments can also be expressed in method form. For example, as shown in the flow diagram of FIG. 4, embodiments can be described from the point of view of, e.g., an SMF or NEF node. Therein, a method for charging for a first device which is connected to a second device that has radiocommunication connectivity includes the steps of receiving 400, at a node in the radiocommunication system, a connection message from the second device requesting a connection to the radiocommunication system, the connection message including a device identifier associated with the first device; and sending 402, by the node in the radiocommunication system, a charging authorization message for the second device's connection to the radiocommunication system, which charging authorization message includes the device identifier associated with the first device.

Similarly, embodiments can be expressed from the point of view of the CHF node as shown in FIG. 5. Therein, a method for charging for a first device which is connected to a second device that has radiocommunication connectivity includes the steps of receiving 500, at a node in the radiocommunication system, a charging authorization message for the second device's connection to the radiocommunication system, which charging authorization message includes the device identifier associated with the first device; adding 502, by the node in the radiocommunication system, the device identifier for the first device to a list associated with the second device; and sending 504, by the node in the radiocommunication system, an indication that a connection for the first and second device is authorized.

Figure 6:
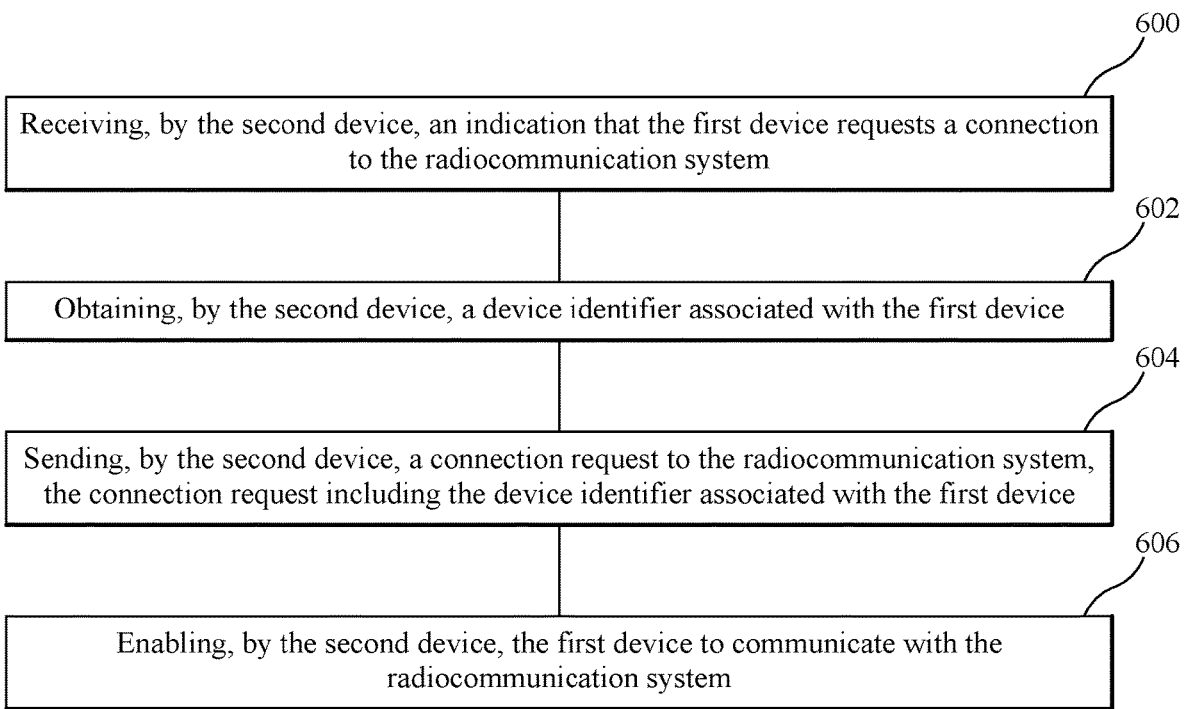

Moreover, the embodiments can be expressed from the point of view of, for example, a 5G CE as shown in the flowchart of FIG. 6. Therein, a method for connecting a first device to a radiocommunication system via a second device that has radiocommunication connectivity includes the steps of receiving 600, by the second device, an indication that the first device requests a connection to the radiocommunication system; obtaining 602, by the second device, a device identifier associated with the first device; sending 604, by the second device, a connection request to the radiocommunication system, the connection request including the device identifier associated with the first device; and enabling 606, by the second device, the first device to communicate with the radiocommunication system.

The foregoing embodiments makes it possible for, among other things, the operator to charge for the number of devices that utilize the network without requiring the devices to have 5G connectivity. The MAC address can be used as a device identifier for non-5G connectable devices and is also readily available for the 5G CE device since that device also needs to be able to route requests to e.g., from itself or from the network, to the right device independent of the type of communication used by the devices to connect to the 5G CE device.

Various embodiments described herein refer in some fashion to nodes, e.g., nodes which support functions associated with charging. In some embodiments the non-limiting communication node (also interchangeably called as node or telecommunication node) is more commonly used and it refers to any type of network node which directly or indirectly communicates with a user equipment (UE), a node in one or more operator networks, and a core network.

The disclosed embodiments provide methods and devices for enabling non-5G connectable devices to connect to a network through a 5G capable device. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 7:
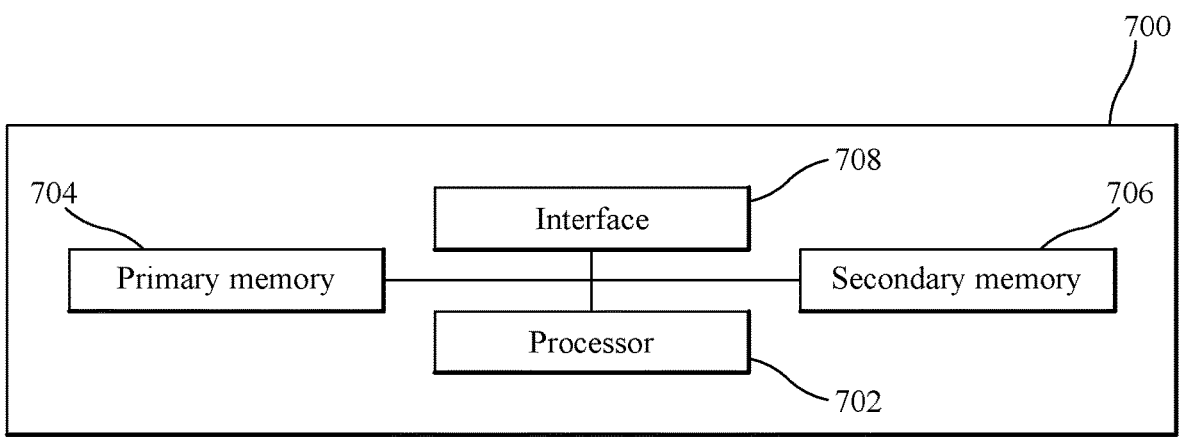
FIG. 7 depicts a communication node according to an embodiment.

Embodiments described above can be implemented in one or more nodes (or servers). An example of a communication node 700 is shown in FIG. 7. The communication node 700 (or other network node) includes a processor 702 for executing instructions and performing the functions described herein, e.g., the functions performed by the 5G CE 104, the SMF/NEF 110 and the CHF 112. The communication node 700 also includes a primary memory 704, e.g., random access memory (RAM) memory, a secondary memory 706 which can be a non-volatile memory, and an interface 708 for communicating with other portions of a network or among various nodes/servers in support of charging.

Processor 702 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other communication node 700 components, such as memory 704 and/or 706, node 700 functionality in support of the various embodiments described herein. For example, processor 702 may execute instructions stored in memory 704 and/or 706.

Primary memory 704 and secondary memory 706 may comprise any form of volatile or non-volatile computer readable memory including, without limitation, persistent storage, solid state memory, remotely mounted memory, magnetic media, optical media, RAM, read-only memory (ROM), removable media, or any other suitable local or remote memory component. Primary memory 704 and secondary memory 706 may store any suitable instructions, data or information, including software and encoded logic, utilized by node 700. Primary memory 704 and secondary memory 706 may be used to store any calculations made by processor 702 and/or any data received via interface 708.

Communication node 700 also includes communication interface 708 which may be used in the wired or wireless communication of signaling and/or data. For example, interface 708 may perform any formatting, coding, or translating that may be needed to allow communication node 700 to send and receive data over a wired connection. Interface 708 may also include a radio transmitter and/or receiver that may be coupled to or a part of the antenna. The radio may receive digital data that is to be sent out to other network nodes or wireless devices via a wireless connection. The radio may convert the digital data into a radio signal having the appropriate channel and bandwidth parameters. The radio signal may then be transmitted via an antenna to the appropriate recipient.

Figure 8:
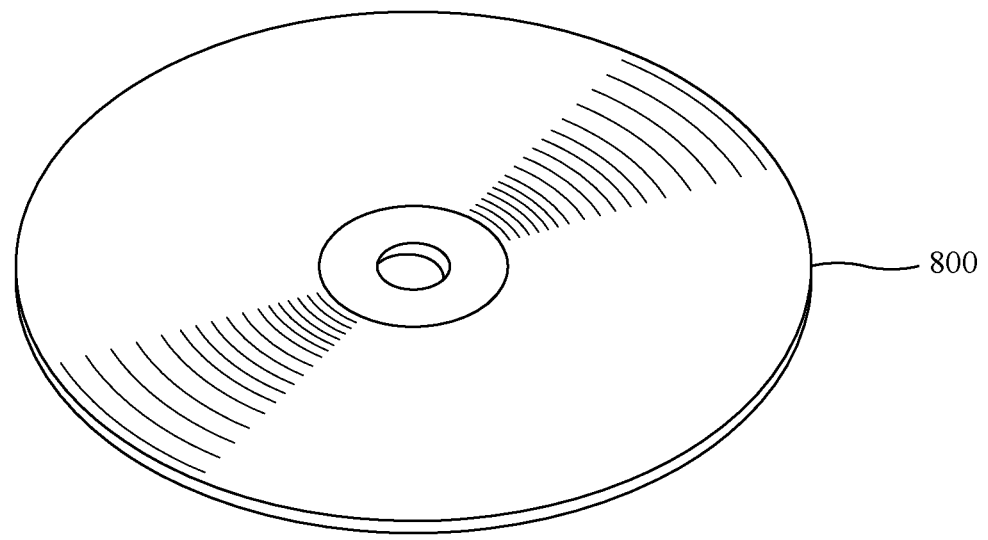
FIG. 8 depicts an electronic storage medium on which computer program embodiments can be stored.

As also will be appreciated by one skilled in the art, the embodiments may take the form of an entirely hardware embodiment or an embodiment combining hardware and software aspects. Further, the embodiments, e.g., the configurations and other logic associated with the charging process to include embodiments described herein, such as, the methods associated with FIGS. 4-6, may take the form of a computer program product stored on a computer-readable storage medium having computer-readable instructions embodied in the medium. For example, FIG. 8 depicts an electronic storage medium 700 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for charging for a first device which is connected to a second device that has radiocommunication connectivity, the method comprising:

receiving, at a node in the radiocommunication system, a charging authorization message for the second device's connection to the radiocommunication system, which charging authorization message includes the device identifier associated with the first device;

adding, by the node in the radiocommunication system, the device identifier for the first device to a list associated with the second device;

sending, by the node in the radiocommunication system, an indication that a connection for the first and second device is authorized; and charging, by the node in the radio communication system, for the connection to the radiocommunication system based on how many first devices are connected to the second device.

2. The method of claim 1, wherein the first device does not include a radio transceiver which is capable of connecting to the radiocommunication system and wherein the second device does include a radio transceiver which is capable of connecting to the radiocommunication system.

3. The method of claim 1, wherein the first device is connected to the second device via one or more of Wifi, Bluetooth, Ethernet and NFC.

4. The method of claim 1, wherein the device identifier is one of a media access control (MAC) address, an IPV6 address or a universally unique identifier (UUID).

5. The method of claim 1, further comprising:

charging differently for different types of the first devices.

6. The method of claim 5, wherein the first device consumes power from the second device and is associated with a higher charge than another first device that is connected to the second device and does not consume power from the second device.

7. The method of claim 1, further comprising:

receiving at the node a triggering message associated with at least one of adding another first device to the list, removing the first device from the list and changing information associated with the first device; and modifying the list based on the triggering message.

8. A method for charging for a first device which is connected to a second device that has radiocommunication connectivity, the method comprising:

receiving, at a node in the radiocommunication system, a connection message from the second device requesting a connection to the radiocommunication system, the connection message including a device identifier associated with the first device;

sending, by the node in the radiocommunication system, a charging authorization message for the second device's connection to the radiocommunication system, which charging authorization message includes the device identifier associated with the first device; and charging, by the node in the radio communication system, for the connection to the radiocommunication system based on how many first devices are connected to the second device.

9. The method of claim 8, wherein the first device does not include a radio transceiver which is capable of connecting to the radiocommunication system and wherein the second device does include a radio transceiver which is capable of connecting to the radiocommunication system.

10. The method of claim 8, wherein the first device is connected to the second device via one or more of WiFi, Bluetooth, Ethernet and NFC.

11. The method of claim 8, further comprising:

receiving, by the node in the radiocommunication system, an indication that a connection for the first and second device is authorized; and wherein the second device either provides the authorized connection by allowing the first device to access the radiocommunication system via its radiocommunication connectivity or sends data received from the first device to the radiocommunication system.

12. The method of claim 8, wherein the device identifier is one of a media access control (MAC) address, an IPV6 address or a universally unique identifier (UUID).

13. A node in a telecommunication system for charging for a first device which is connected to a second device that has radiocommunication connectivity, the node comprising:

a communication interface configured to receive a charging authorization message for the second device's connection to the radiocommunication system, which charging authorization message includes the device identifier associated with the first device;

a processor configured to add the device identifier for the first device to a list associated with the second device; and wherein the processor is further configured to:

send, via the communication interface, an indication that a connection for the first and second device is authorized, and charge for the connection to the radiocommunication system based on how many first devices are connected to the second device.

\* \* \* \* \*